US009348992B2

(12) United States Patent
Kassaei

(10) Patent No.: US 9,348,992 B2
(45) Date of Patent: May 24, 2016

(54) LINKED IDENTITIES

(75) Inventor: Farhang Kassaei, San Jose, CA (US)

(73) Assignee: eBay Inc., San Jose, CA (US)

( * ) Notice: Subject to any disclaimer, the term of this patent is extended or adjusted under 35 U.S.C. 154(b) by 103 days.

(21) Appl. No.: 13/007,042

(22) Filed: Jan. 14, 2011

(65) Prior Publication Data

US 2012/0005739 A1 Jan. 5, 2012

Related U.S. Application Data

(60) Provisional application No. 61/361,289, filed on Jul. 2, 2010.

(51) Int. Cl.
*G06F 17/30* (2006.01)
*G06F 21/41* (2013.01)

(52) U.S. Cl.
CPC ...................................... *G06F 21/41* (2013.01)

(58) Field of Classification Search
CPC ...................................................... G06F 21/41
USPC ............................................................. 726/8
See application file for complete search history.

(56) References Cited

U.S. PATENT DOCUMENTS

| 8,001,200 B1* | 8/2011 | Fletcher ........................ 709/206 |
| 2002/0107918 A1* | 8/2002 | Shaffer et al. ................. 709/203 |
| 2006/0036541 A1* | 2/2006 | Schleicher ....................... 705/39 |
| 2006/0206925 A1* | 9/2006 | Dillaway et al. ................... 726/5 |
| 2009/0125427 A1* | 5/2009 | Atwood et al. .................. 705/35 |
| 2009/0178124 A1* | 7/2009 | Manion et al. ...................... 726/6 |
| 2009/0313147 A1* | 12/2009 | Balasubramanian et al. .. 705/30 |
| 2010/0132043 A1* | 5/2010 | Bjorn et al. ...................... 726/25 |
| 2010/0269162 A1* | 10/2010 | Bravo et al. ........................ 726/6 |
| 2011/0010762 A1* | 1/2011 | Nijdam et al. ...................... 726/5 |
| 2011/0126272 A1* | 5/2011 | Betzler et al. ...................... 726/6 |
| 2011/0231911 A1* | 9/2011 | White et al. ....................... 726/7 |
| 2013/0218778 A1* | 8/2013 | Singh ............................. 705/44 |

* cited by examiner

*Primary Examiner* — Nirav B Patel
*Assistant Examiner* — Mohammed Waliullah
(74) *Attorney, Agent, or Firm* — Schwegman, Lundberg & Woessner, P.A.

(57) ABSTRACT

Methods and systems to automatically respond to make a Super Identity by linking two identities and methods and systems to use the identities include a transaction authorization module that receives a request associated with a first identity record associated with a user, the request being for information associated with a second identity record. An identity linking module identifies that the second identity record is linked to the first identity record and retrieves the information associated with the second identity record. The transaction authorization module also generates a response including the information associated with the second identity, and transmits the response.

16 Claims, 7 Drawing Sheets

LINKED IDENTITIES

CROSS-REFERENCE TO A RELATED APPLICATION

This application claims the benefit of U.S. Provisional Patent Application entitled "Linked Identities," App. No. 61/361,289, filed Jul. 2, 2010, the content of which is herein incorporated by reference in its entirety.

TECHNICAL FIELD

This application relates to a method and system for use with a website or other online platform, according to one embodiment. More specifically, this application relates to the use of identities on various websites.

BACKGROUND

Many websites provide digital identities for users. For example, users may have a digital identity or account on one or more email services websites, social networking websites, marketplace websites, merchant websites, banking services websites, payment services websites, among others. These digital identities may be identified in various ways, such as screen names, account identifiers, email addresses, etc. It is common for users to have many digital identities on more than one website.

However, the identities created at these websites are limited in scope. They only identify a user on the website the identity is associated with and managing multiple digital identities is difficult for a user. For example, entering personal information when signing up for a digital identity account, keeping track of multiple identity identifiers (e.g., screen names or account numbers), and remembering the passwords associated with the identities is cumbersome. Having many digital identities also may make a user more prone to security issues (e.g., phishing attacks, privacy concerns, etc.) and privacy concerns. For entities providing digital identities, supporting a number of digital identities and the information associated with them is also costly.

BRIEF DESCRIPTION OF THE DRAWINGS

The various embodiments are illustrated by way of example, and not by way of limitation, in the figures of the accompanying drawings in which.

DETAILED DESCRIPTION

Figure 1:
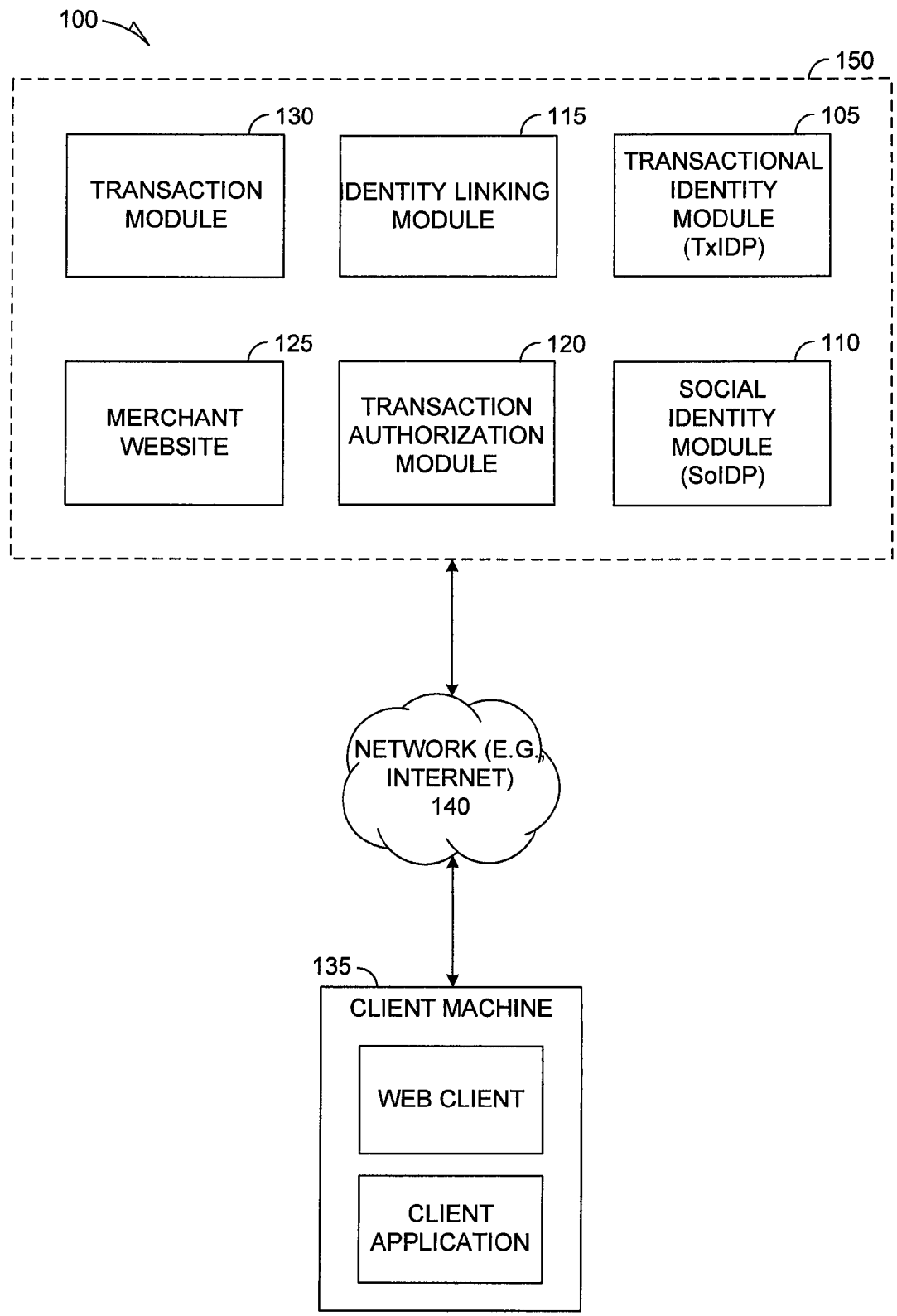
FIG. 1 is a network diagram depicting a network system 100, according to one embodiment.

In the following description, for purposes of explanation, numerous specific details are set forth in order to provide a thorough understanding of the various embodiments. It will be evident, however, to one of ordinary skill in the art that the various embodiments may be practiced without these specific details.

In various embodiments, a system and method for linking one identity of a user to at least one other identity of the user is disclosed. The linking between the two or more identities may be referred to as a "Super Identity." In one embodiment, the linked identities (e.g., Super Identities) are also enabled to be used across various websites and platforms. In another embodiment, the linked identities enable a platform or website to access information from any identity of the linked identities.

Systems and methods for use of the linked identities are also disclosed. For example, a website or application platform where a user is signed on using one identity may access information associated with another identity if the two identities have been linked. In some cases, the website or application platform may be associated with the identity that the user uses to sign on with, however, in some embodiments, the website or application platform may allow an identity that is not associated with the website or application (e.g., a third party identity) to be used to sign on a user. In this context, a "user" may be any entity (e.g., a person, a company, an application, etc.) and an identity is a set of information that uniquely identifies a user.

The identities to be linked may comprise different sets of information associated with an entity. Although what is disclosed covers linkages between any two or more identities, various embodiments discussed below may contemplate linking a transactional identity with a non-transactional identity in order to more clearly explain what is disclosed and illustrate certain features. Other embodiments may contemplate the use of the linked identities to access data for financial transactions, however any other access of data in other types of identities for other uses may be similarly implemented.

As mentioned above, in various embodiments the identities to be linked may include a unique transactional identity and a unique non-transactional identity. A transactional identity is an identity that may be used in a transaction (e.g., contains or has access to all information needed to conduct a financial transaction). For example, in addition to a unique identity identifier, a transactional identity may include payment instrument information (e.g., payment account identifier, expiration date, security code, etc.) for one or more payment instruments belonging to an entity, a password, an account identifier, billing addresses of the entity, shipping addresses of the entity, phone numbers of the entity, a first name, a last name, a date of birth, an email address, a last verified date (representing the last time one or more information fields was updated or verified), among others.

Transactional identities may also be managed in such a way as to attempt to achieve several "qualities" or characteristics. One such quality is authenticity. A transactional identity may be managed by a transactional identity management system to ensure the validity or authenticity of data. In one embodiment, the transactional identity management system may ensure that each data field in a transactional identity is syntactically and semantically correct. For example, the transactional identity management system may perform a check to ensure that a phone number is made of numerals and that the phone number is a valid phone number for its locale.

The transactional identity management system may also manage a transactional identity to ensure that the information included in the transactional identity does not conflict. For example, the transactional identity management system may verify that the address, phone number, email address, etc. listed in the transactional identity corresponds to or is owned by an entity identified by the first name and last name listed in the transactional identity. In another embodiment, the information associated with the transactional identity may be verified by the transaction identity management system by searching another data store containing the information and verifying its accuracy.

The transactional identity management system may also make sure that the user associated with the transactional identity consents to the creation of the transactional identity. For example, if person A has access to valid set of information belonging to person B, and if person A attempts to create a transactional identity representing person B without her knowledge, person A should not be able to complete the registration of that transactional identity because the steps implemented by transactional identity management system ensure consent must fail. The transactional identity management system may do this by requesting private data that only person B would have. The transactional identity management system may also be capable of ensuring that control of the identity is given to its rightful owner. The owner should be able to view all information and all super identities formed based on transactional identity. Users should also be able to form or de-form transactional identities.

In some embodiments, the transactional identity management system keeps the data in the transactional identity up to date. A user's data may be periodically checked to ensure the information associated with the entity reflects the latest state. The transactional identity may also include a verification date and an expiration date to help the transactional identity management system keep track of the information.

The transactional identity management system may also have classes of assurances depending of the quality of identity data they have obtained from a user. For each class of transactional identity, the transactional identity management system issues an assurance level. The assurance level of a transactional identity may be associated with a purchasing limit for the identity as determined by transactional identity management system. In addition, transactional identity management system can issue a guarantee up to that amount (e.g., the transactional identity management system may cover losses up to a certain amount if the provided identity proves to be inaccurate or false).

A non-transactional identity may or may not include the information or qualities that are included in a transactional identity. For example, one embodiment of a non-transaction identity may comprise some combination of a screen name, email address, first and last name, password, a set of preferences, or other data unrelated to transactions. This data may or may not be verified or authenticated. Example non-transactional identities may be social identities for social networking websites or other identities that are not associated with financial transactions (e.g., identities for news sites, entertainment sites, streaming media sites, online community sites, email accounts, etc.).

Creating Linked Identities

FIG. 1 is a network diagram depicting a network system 100, according to one embodiment. The network system 100 shows server-side modules 150 that include a transactional identity module 105, a non-transactional identity module (e.g., a social identity module 110), an identity linking module 115, a transaction authorization module 120, a merchant website 125, and a transaction module 130. These modules may all be on separate machines in separate locations or platforms where the modules can communicate with one another over a network 140 (e.g., the internet) using a network interface. Furthermore, these modules may be implemented in software, firmware, hardware, or a combination of these.

In other embodiments, however, one or more of the modules may be on the one or more servers of a platform or even on the same machine. For example one or more of the transactional identity module 105, the identity linking module 115, the transaction authorization module 120, and the transaction module 130 may be located on one or more machines of a payment services platform. The server-side modules 150 may also communicate with a client machine 135 via one or more networks 140 (e.g., the Internet). For example, the server-side modules 150 may communicate with a web client or client application of the client machine 135 using an Application Program Interface (API) or web interface.

The social identity module 110 shown in FIG. 1 may be a component or module that is part of a larger social networking platform or website. The social identity module 110 may be used to create and maintain a non-transactional identity for the social networking platform.

The transactional identity module 105, on the other hand, may be used to create and maintain a transactional identity. The transactional identity module 105 may be a separate service on a dedicated machine or may be just one component of a larger platform that provides financial services. In one embodiment, the transactional identity module 105 may be a part of a merchant website that enables users of the merchant website to make purchases on that merchant website. In another embodiment, the transactional identity module 105 may be part of a payment platform that provides merchants and consumers with another means of payment (e.g., a third-party payment processor, a credit or debit account platform, a banking platform, etc.).

The identity linking module 115 may be used to link two or more identities of an entity or user. For example, the identity linking module 115 may receive a request to create a linkage between a transactional identity and a non-transactional identity from one of the transaction identity module 105, the social identity module 110, or the merchant website 125. The identity linking module 115 may generate a link identifier and include it in a link record along with an identifier of the first identity and an identifier of a second identity. The identity linking module 115 may store the record and return the link identifier to the requester. After two identities are linked, the identity linking module 115 may also be used to confirm that one identity is linked to another identity and retrieve information from the identities.

The transaction authorization module 120 may be configured to receive requests associated with one identity, where the requests are for information that may be contained in another identity. For example, a user signed on to a merchant website using their social identity may request transaction information associated with the user's transaction identity in order to purchase a good or service or complete a transaction. The transaction authorization module 120 may work with the identity linking module 115 to verify that the two identities are linked and the transaction authorization module 120 may then generate a response with the requested information and transmit the response to the requester.

Figure 2:
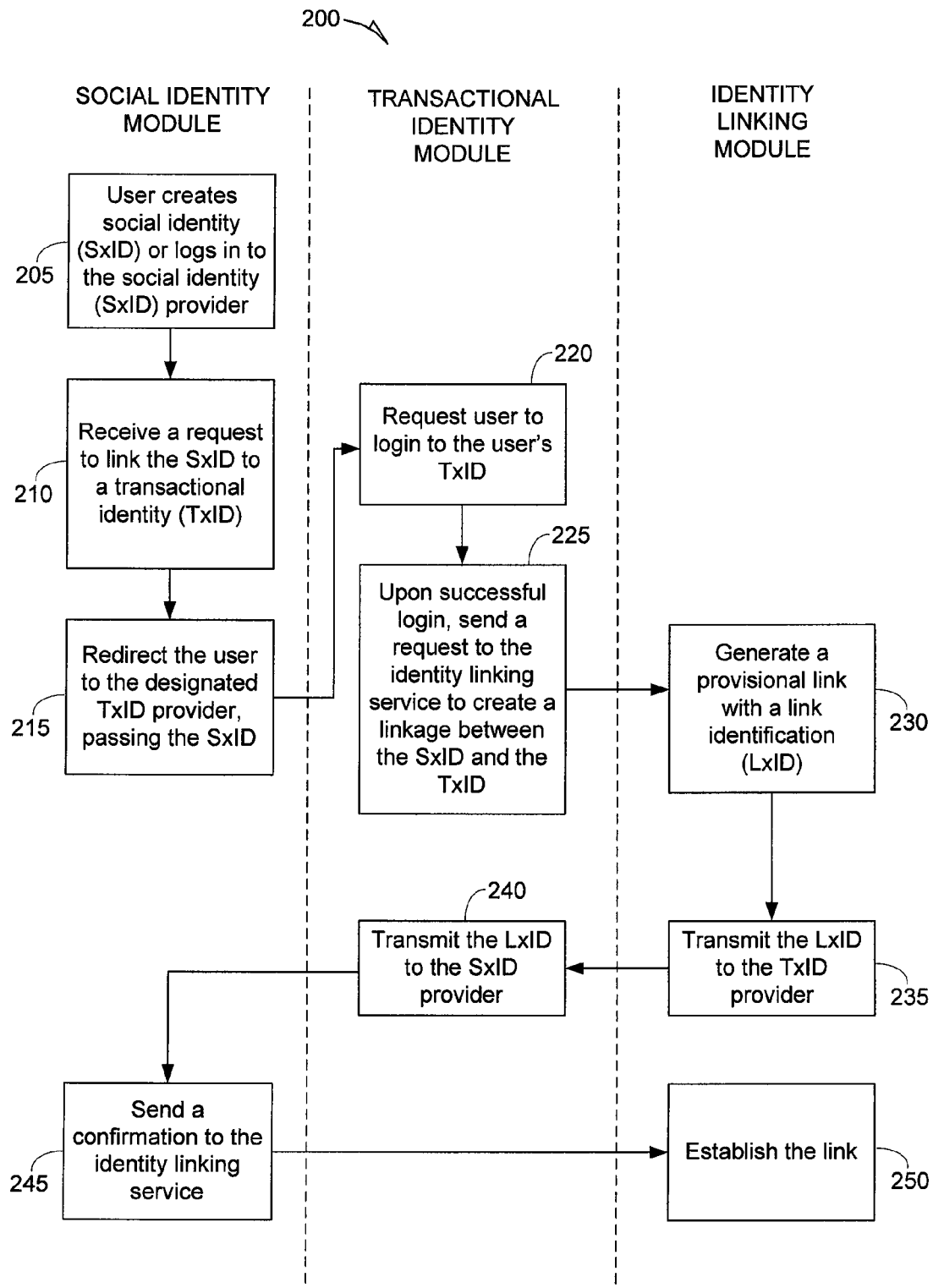
FIG. 2 is a flow diagram illustrating a method 200, according to one embodiment, to form a link between a transactional identity and a social identity.

Further details of these and other embodiments will be provided below. For example, FIG. 2 is a flow diagram illustrating a method 200, according to one embodiment, to form a link between a transactional identity and a social identity. According to the embodiment shown in FIG. 2, the protocol for forming the link between identities may include "double reporting" (e.g., for any formation or changes to the link, both sides of the link have to report the same change to the identity linking module). The method 200 begins at operation 205 when a user creates an identity or logs onto a site with a particular identity. FIG. 2 depicts a scenario where a user creates a social identity or signs on with their social identity at a social identity module 110 of a social identity provider (e.g., the social identity provider). In other embodiments however, a similar process may be initiated at the transactional identity module 105. At operation 210, the social identity module 110 receives a request to link the social identity to a transactional identity specified by a transactional identity identifier. At operation 215, the social identity module 110 redirects the user to the designated transactional identity provider (in this case the transactional identity module 105) and passes the social identity identifier associated with the social identity of the user to the transactional identity module 105.

At operation 220, the transactional identity module 105 requests the user to login to the user's transactional identity (or if the user does not have an account, the transactional identity module 105 will prompt the user to create one). Upon successful login, the transactional identity module 105 may, at operation 225, send a request to create a linkage between the social identity and the transactional identity to the identity linking service (in this case the identity linking module 115). This request may include the transactional identity identifier and the social identity identifier.

When the identity linking module 115 receives the request to create the linkage, it will generate a provisional link and a link identification associated with the provisional link at operation 230. After the provisional link is generated, the identity linking module 115 will transmit the link identification to the transactional identity provider (the transactional identity module 105) at operation 235. The transactional identity provider (the transactional identity module 105) may in turn transmit the link identification to the social identity provider (the social identity module 110) at operation 240. In another embodiment, the identity linking module 115 may transmit the link identification directly to the social identity module 110. Once the link identification is received, the modules will understand that a provisional link has been established between the two identities at the identity linking module 115.

In order to remove the provisional status from the link, in one embodiment, the social identity module 110 may send a confirmation to the identity linking module 115 at operation 245. In response to receiving the confirmation, the identity linking module 115 will remove the provisional status of the link and fully establish the link at operation 250. When the link is finally established, it may be stored as a record in a memory (e.g., a database) by the identity linking module 115. The record may comprise the social identity identifier, the transactional identity identifier, and the link identifier.

During this process, the social identity module 110 may, in some embodiments, prompt the user to enter a link secret (e.g., a PIN number, a verification code, etc.) to be stored with the link. The link secret may transmitted to the identity linking module 115 where it may be associated with the link record and stored where it can later be used to ensure that an entity attempting to access information in one of the identities of the link is authorized to access it.

Figure 3:
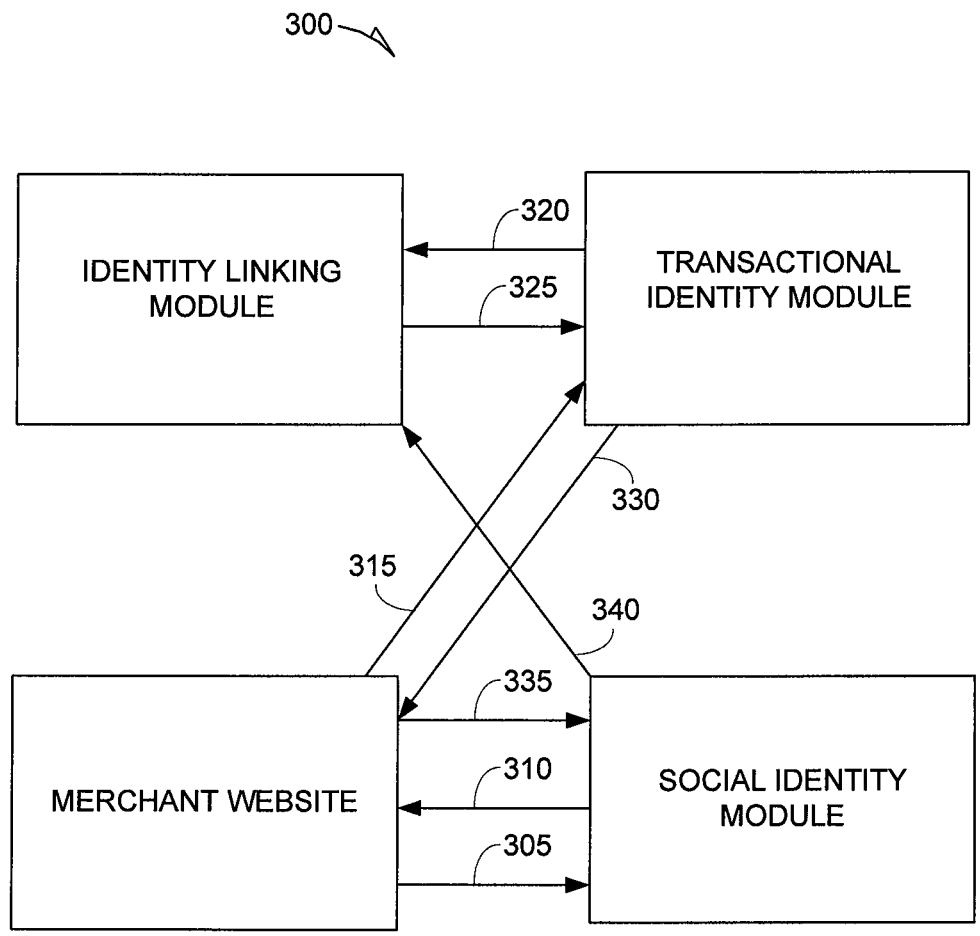
FIG. 3 is a data flow diagram illustrating a method 300, according to one embodiment, to form a link between a transactional identity and a social identity.

In certain embodiments, a social identity module 110 may allow a user to create a social identity or log into their social identity from a third party merchant website. Similarly, a transactional identity module may also allow a user to create a transactional identity or log into their transactional identity from a third party merchant website. FIG. 3 shows one such embodiment.

FIG. 3 is a data flow diagram illustrating a method 300, according to one embodiment, to form a link between a transactional identity and a social identity. In FIG. 3, a user that already has an account with the social identity module 110 may visit a third-party merchant website 125 and attempt to sign in at the third-party merchant website 125 using the user's social identity by, for example, providing a social identity identifier and a password. The merchant website 125 may submit a log on request, at 305, to the social identity module 110 of a social identity provider such as a social networking website. At 310, the social identity module 110 may authenticate the user and return social identity information to the merchant website 125. In some cases, the returned social identity information may include just a confirmation that the user may sign in. In other cases, however, the returned social identity information may include other data associated with the user's social identity (e.g., user names, user profile information, user preferences, etc.).

At 315, the merchant website 125 may send a request to link the social identity of the user with a transaction identity to a transactional identity module 105. If the user has an existing transaction identity, the transactional identity module 105 checks to see if the user's credentials are valid, for example, the identity module 105 may receive a transactional identity identifier and password and check to see if the transactional identity identifier and password are valid. If the user does not already have an account, the transactional identity module 105 may start an account creation process for the user.

At 320, the transactional identity module 105 sends a request to link the social identity and the transactional identity to the identity linking module 115. In response to receiving the request, the identity linking module 115 may generate a provisional link with a link identification and transmits the link identification back to the transactional identity module 105 at 325. At 330, the transactional identity module 105 transmits the link identification back to the merchant website 125.

The merchant website 125, at 335, notifies the social identity module 110 of notification of the link request and transmits linking identification to a social identity module 110. Thus each of the modules (e.g., the identity linking module 115, the transactional identity module 105, the merchant website 125, and the social identity module 110) has knowledge of the linking of the two identities. However, in another embodiment, the identity linking module 115 may transmit the link identification directly to the social identity module 110 or the merchant website 125 instead of first transmitting it to the transactional identity module 105.

Returning to FIG. 3, at 340, the social identity module sends a confirmation to the identity linking module 115. Once the confirmation is received, the identity linking module 115 may finalize the link creation and notify the merchant website 125 that the link has been finalized.

FIG. 3 illustrates one embodiment of a method to link a social identity and a transactional identity but many other variations exist. For example, in one embodiment, the merchant website 125 may also prompt the user to enter a link secret. The link secret may be received by the identity linking module 115 to be stored. Eventually, as will be discussed below, the link secret may be used to verify that a user consents to a transaction or the accessing of information in one of the identities associated with the user. In another embodiment, one or both of transaction identity module 105 and the social identity module 110 may also keep a separate record of the linked identities so that they may contact the identity linking module 115 directly to access information associated with an identity.

Using the Linked Identities

Figure 4:
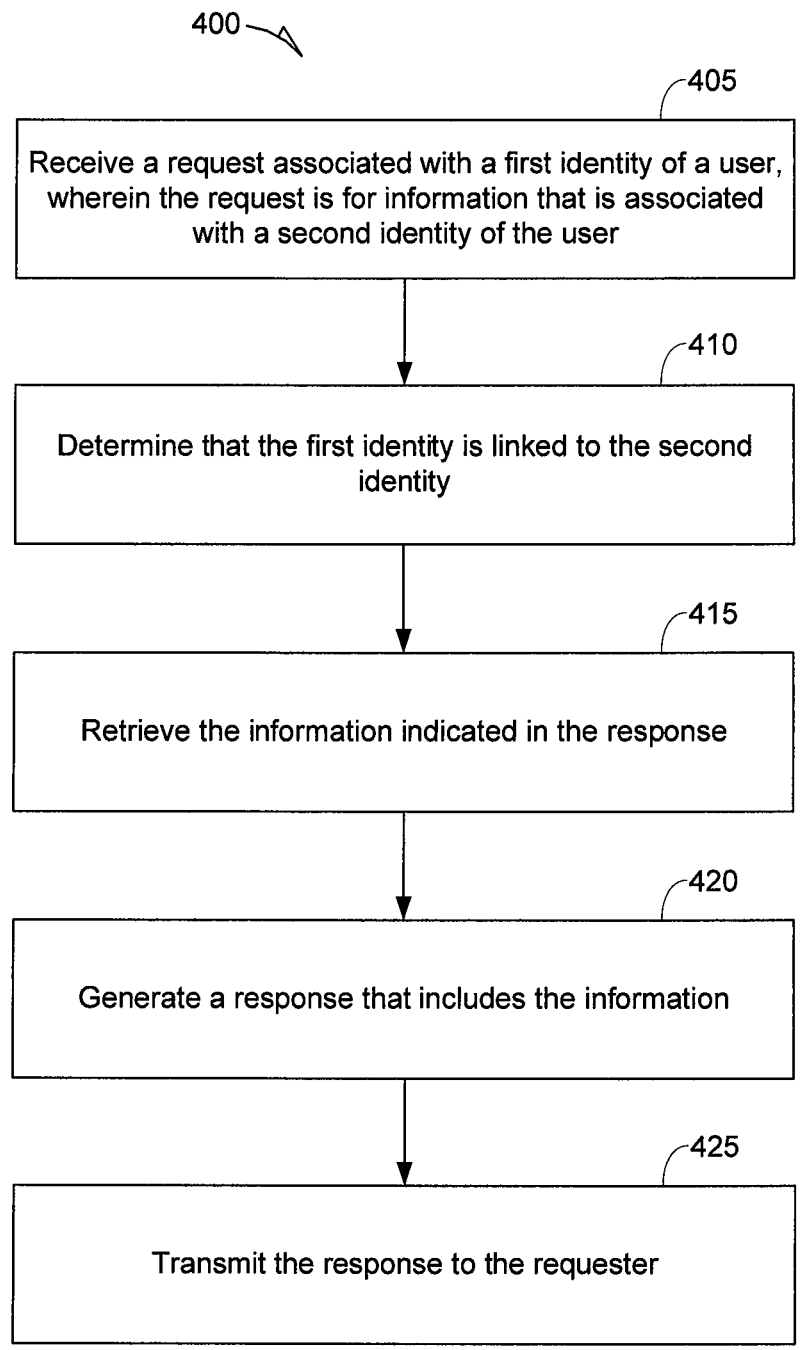
FIG. 4 is a flow chart that illustrates a method 400 to retrieve information from one of the linked identities.

Once a linking between two or more identities is formed, it can be used (and accepted) by any website affiliated with either of the identities or third party websites. For example, FIG. 4 is a flow chart that illustrates a method 400 to retrieve information from one of the linked identities. The method 400 begins at 405 when a transaction authorization module 120 receives a request associated with a first identity of a user where the request is for information that is associated with a second identity of the user. In some embodiments, the request may comprise a second identity identifier or a link identifier so that it may be determined whether the first identity is linked with the second identity.

The identity linking module 115 may determine that the first identity is linked to the second identity at 410. For example, the identity linking module 115 may locate, based on the first identity identifier, the second identity identifier, or the link identifier, a link record that references a record for the first identity and a record for the second identity. If the first identity is linked to the second identity, the linking module 115 may retrieve the information indicated in the response at 415 from a database or, in some embodiments, the second identity provider. After the information is retrieved the transaction authorization module 120 may generate a response that includes the information at 420 and transmit the response to the requester at 425.

In some embodiments, before transmitting the response to the requester, the transaction authorization module 120 may attempt to verify that the user associated with the identities consents to the request (e.g., the user consents to the access and retrieval of information). This may be done by, for example, requesting a secret (e.g., PIN or code) from the user and verifying that a received secret is matches the code stored by the transaction authorization module 120.

Figure 5:
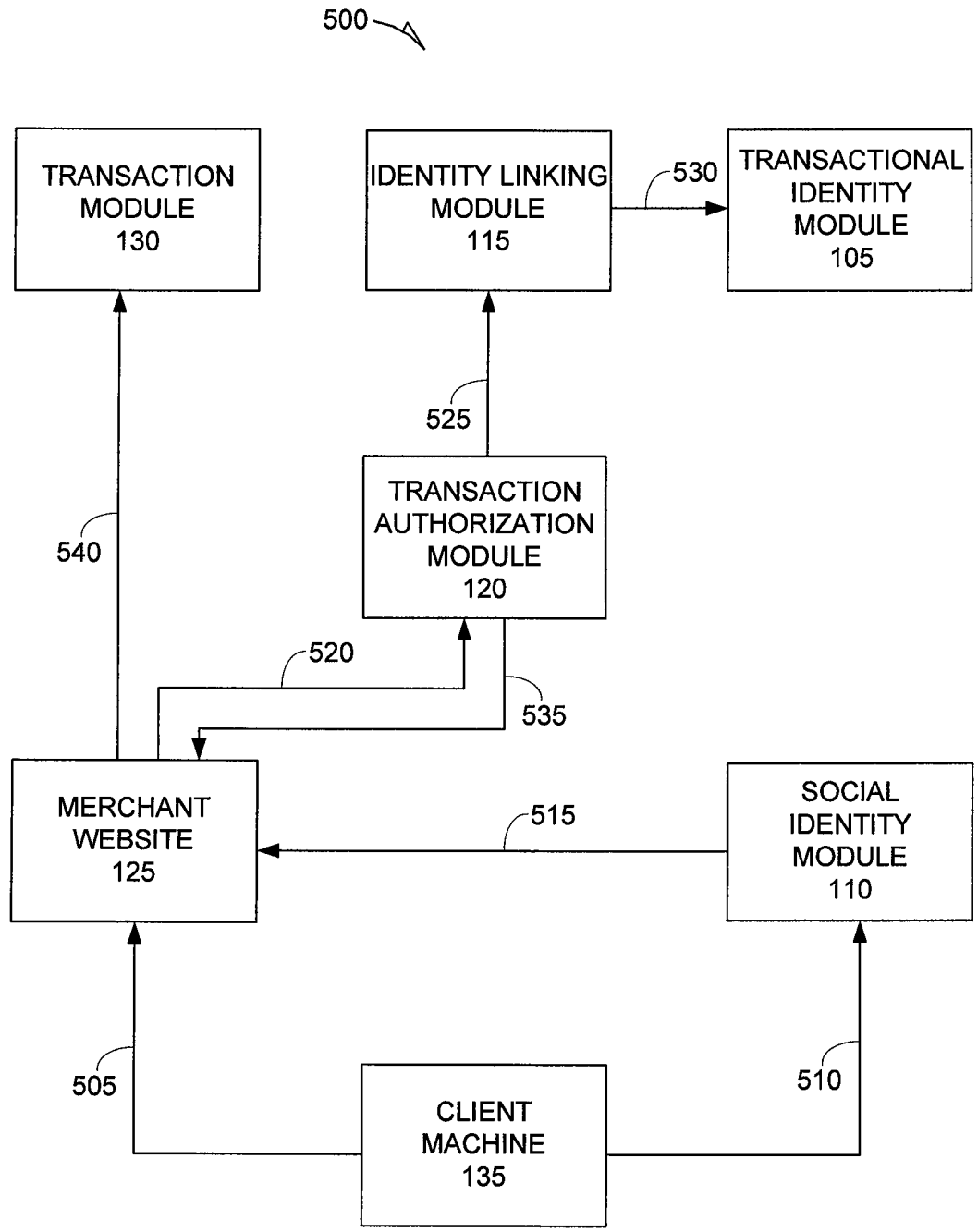
FIG. 5 is a data flow diagram illustrating a method 300, according to one embodiment, to use a link between a transactional identity and a social identity.

In another embodiment, the information requested is information that is needed to execute a transaction. For example, the information may be billing information or a transaction authorization code. FIG. 5 illustrates one such embodiment.

FIG. 5 is a data flow diagram illustrating a method 500, according to one embodiment, to use a link between a transactional identity and a social identity. In particular, FIG. 5 illustrates an embodiment where a merchant website (and a user accessing the website) uses a linking between a social identity and a transactional identity in making a purchase. The method begins at 505 when a user visits a merchant website 125 and uses the merchant website's interface to perform an action that requires data from one of the identities. For example, the user may wish to purchase an item or service that requires payment information from a transactional identity. In other embodiments, the user may simply wish to get payment information from the transactional identity and store it at the merchant website 125. The user may be asked to log on to their social identity at 510 either by logging on to the social identity module 110 directly or by being redirected by the merchant website 125 to an interface provided by the social identity module 110. The user follows the login protocol provided by the interface and, after successful logging in, the social identity module may transmit, at 515, data stored in the social identity and/or link information to the merchant website 125. The link information may comprise a transactional identity identifier of the user or a link identifier. The merchant website receives this information and may use the information to fill out one or more data fields (e.g., user name, date of birth, user preferences, etc.) needed for the purchase transaction.

After receiving the response from the social identity module 110, the merchant website 125 may transmit to the transaction authorization module 120 a request for information at 520. The request for more information may include the link identifier, the social identity identifier, or the transactional identity identifier. The transaction authorization module 120 verifies that the merchant website's request is actually consented to by the user who owns the linked identities. In one embodiment, if a link secret (e.g., a PIN number) was included in the request, the transaction authorization module 120 may communicate with the identity linking module 115 at 525 to check that the link secret matches a stored link secret associated with that link. The transaction authorization module 120 may also prompt the user or cause the merchant website 125 to prompt the user to enter the link secret in a separate transmission. In another embodiment, the transaction authorization module 120 may send to the user a code (e.g., a one time password) to the user. For example, the code may be sent in an email to the user's email address, a text message to the user's phone number, an instant message to a user's chat screen name, an automated voice call, etc. The merchant website 125 may prompt the user for the code received from the transaction authorization module. After receiving the code from the user, the merchant website 125 may transmit the code to the transaction authorization module 120 so that the transaction authorization module 120 can verify the consent of the user or authenticate the request.

If the merchant website 125 requires information associated with the transactional identity (e.g., payment information, billing address, or other data needed for the transaction to the merchant website), the identity linking module 115 may retrieve the information from a database or request additional transactional identity information from the transactional identity module 105 at 530. If the merchant website 125 requires an authorization to perform a transaction, the transaction authorization module 120 may generate an authorization (e.g., an Authorized Session Code (ASC)) and, at 535, the transaction authorization module 120 may transmit the authorization or information to the merchant website 125. In another embodiment, this transactional identity information is not transmitted to the merchant website 125 and will instead be provided to the transaction module 130 in order to provide a more secure transaction where the merchant website 125 or other third-party website will not have access to the payment information of a user.

Returning to the embodiment of FIG. 5, at 540, the merchant website 125 transmits, to the transaction module 130, a request to execute the transaction, the authorized session code, and any additional transaction information needed to complete the transaction such as the amount of the transaction. The transaction module 130 may use the authorized session code to check (either in place or by contacting transaction authorization module 120) that the merchant website 125 is authorized to request and make the transaction. If the transaction is authorized, the transaction module 130 will execute the transaction. As discussed above, if any additional transactional identity information is needed, the transaction module 130 may request and receive the information from the identity linking module 115.

Removing the Link

Figure 6:
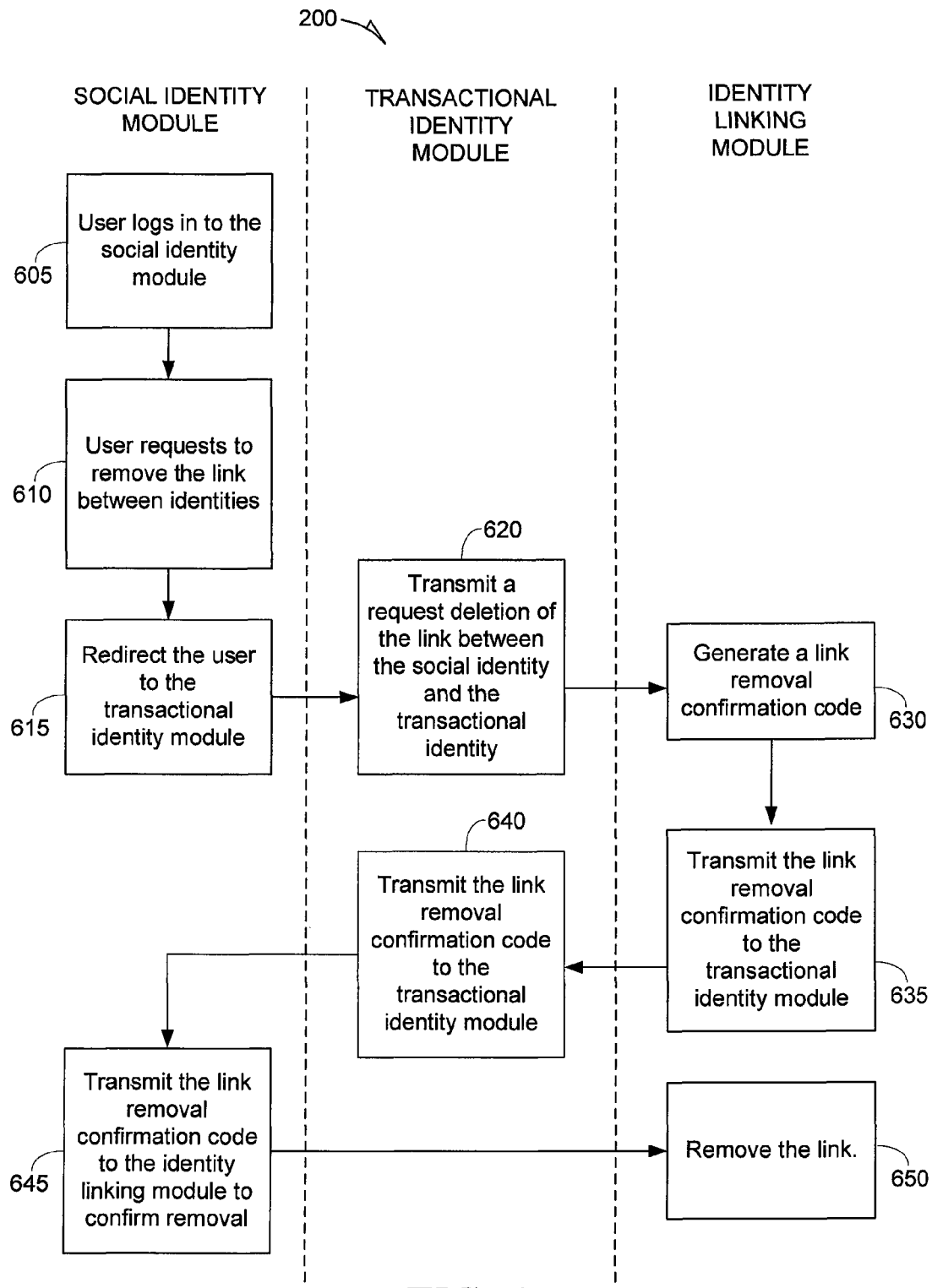
FIG. 6 is a flow diagram illustrating a method 500, according to one embodiment, to remove a link between a transactional identity and a social identity.

The transactional identity management system may also enable a user to destroy or remove the linking between two identities. For example, FIG. 6 is a flow diagram illustrating a method 600, according to one embodiment, to remove a link between a transactional identity and a social identity. Although the embodiment shown begins with a user logging into the social identity module 110 of a social identity provider, other embodiments may begin at the transactional identity module 105, the identity linking module 115, or a third party website. At operation 605, a user logs into the user's social identity at the social identity module 110 (e.g., a user may log into a social networking website). The user may use the interface provided by the social identity module 110 to remove the link between a social identity and a transactional identity at operation 610. In one embodiment, the social identity module 110 will attempt to verify the ownership of the identities by, for example, prompting the user to enter a link secret (e.g., a PIN number) associated with the link. Once the ownership is verified, the social identity module 110 may redirect the user to an interface provided by the transactional identity module 105 along with an indication that the user requests the removal of the link at operation 615. In one embodiment, the transaction identity module 105 may attempt to verify ownership of the link again by, for example, prompting the user to enter the link secret again. The transactional identity module 105 will transmit, to the identity linking module 115, a request deletion of the link between the social identity and the transactional identity at operation 620. After receipt of the request, the identity linking module 115, at operation 630, generates a link removal confirmation code and transmits the link removal confirmation code back to the transactional identity module 105 at operation 635. After receiving the link removal confirmation code, the transactional identity module 105 transmits the link removal confirmation code to the social identity module 110 at operation 640. At operation 645, the social identity module 110 receives the link removal confirmation code and confirms the removal of the link by transmitting to the identity linking module 115 the link removal confirmation code received from the transactional identity and, in some embodiments, the link identification. The identity linking module 115 then removes the link at operation 650 by deleting the link record or by placing a "removed" status in the link record.

Figure 7:
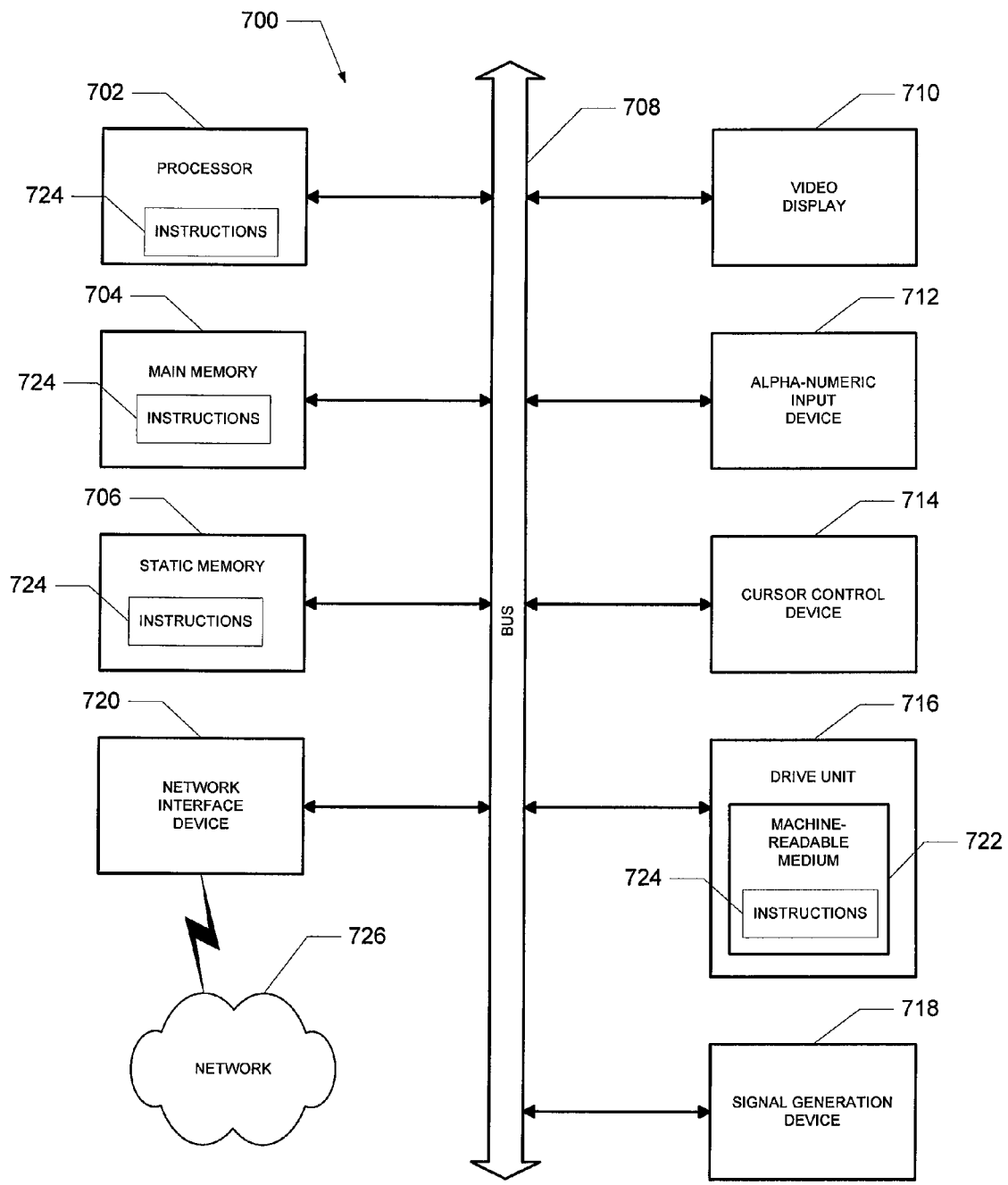
FIG. 7 shows a diagrammatic representation of machine in the example form of a computer system within which a set of instructions when executed may cause the machine to perform any one or more of the methodologies discussed herein.

FIG. 7 shows a diagrammatic representation of a machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" shall accordingly be taken to include, but not be limited to, solid-state memories, optical media, and magnetic media.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

We claim:

1. A method, comprising:
receiving, from a merchant having access to a first identity record associated with a user, a request associated with the first identity record, the request being for payment instrument information of the user for execution of a transaction by the merchant, the payment instrument information being associated with a second identity record, the payment instrument information being selected from the group consisting of a payment account identifier, an expiration date, and a security code;
identifying, by at least one processor, that the second identity record is linked to the first identity record;
retrieving the payment instrument information of the user associated with the second identity record;
verifying that the user consents to the request;
determining an assurance level based on an authenticity of identity data in the second identity record;
generating, by the at least one processor, a response comprising the assurance level and the payment instrument information of the user associated with the second identity record; and
in response to the receiving of the request associated with the first identity record, transmitting the response to the merchant.

2. The method of claim 1, wherein the verifying that the user consents to the request comprises:
receiving a secret; and
verifying the secret.

3. The method of claim 1, wherein the retrieving comprises requesting the information from a provider of the second identity record.

4. The method of claim 1, wherein the request comprises a first identity identifier corresponding to the first identity record and a second identity identifier corresponding to the second identity record.

5. The method of claim 1, wherein the identifying that the second identity record is linked to the first identity record comprises finding a link record in a database indicating that the second identity record is linked to the first identity record.

6. The method of claim 1, wherein the first identity record is for a social identity and the second identity record is for a transactional identity.

7. The method of claim 6, further comprising determining a purchasing limit for the second identity based on the assurance level.

8. The method of claim 1, further comprising determining a guarantee amount for the transaction based on the assurance level.

9. The method of claim 1, wherein the verifying that the user consents to the request includes sending a code to the user in a first communication channel and receiving the code from the user in a second communication channel.

10. A system, comprising:
a memory having instructions embodied thereon; and
one or more processors configured by the instructions to perform operations comprising:
receiving, from a merchant having access to a first identity record associated with a user, a request associated with the first identity record, the request being for payment instrument information of the user for execution of a transaction by the merchant, the payment instrument information being associated with a second identity record, the payment instrument information being selected from the group consisting of a payment account identifier, an expiration date, and a security code;
determining that the second identity record is linked to the first identity record;
retrieving the payment instrument information of the user associated with the second identity record;
verifying that the user consents to the request;
generating a response comprising an assurance level based on an authenticity of identity data in the second identity record and the payment instrument information of the user associated with the second identity record; and
in response to the receiving of the request associated with the first identity record, transmitting the response to the merchant.

11. The system of claim 10, wherein the one or more modules are to verify that the user consents to the request by receiving a secret and verifying the secret.

12. The system of claim 10, wherein the one or more modules are further to request the information from a provider of the second identity record.

13. The system of claim 10, wherein the request comprises a first identity identifier and at least one second identity identifier.

14. The system of claim 10, wherein the one or more modules are further to search for a link record in a database indicating that the second identity record is linked to the first identity record.

15. The system of claim 10, wherein the first identity record is for a social identity and the second identity record is for a transactional identity.

16. A non-transitory machine-readable medium comprising instructions which, when executed by one or more processors of a machine, cause the machine to perform operations comprising:
- receiving, from a merchant having access to a first identity record associated with a user, a request associated with the first identity record, the request being for payment instrument information of the user for execution of a transaction by the merchant, the payment instrument information being associated with a second identity record, the payment instrument information being selected from the group consisting of a payment account identifier, an expiration date, and a security code;
- identifying that the second identity record is linked to the first identity record;
- retrieving the user information associated with the second identity record;
- verifying that the user consents to the request;
- determining an assurance level based on an authenticity of identity data in the second identity record;
- generating a response comprising the assurance level and the payment instrument information of the user associated with the second identity record; and
- in response to the receiving of the request associated with the first identity record, transmitting the response to the merchant.

* * * * *